3,210,212
PROCESS OF PRODUCING ACRYLIC SURFACED MATERIAL

William G. Carson, Moorestown, N.J., and Charles H. Kroekel, Philadelphia, Pa., assignors to Rohm & Haas Company, Philadelphia, Pa., a corporation of Delaware
No Drawing. Filed Aug. 24, 1962, Ser. No. 219,104
4 Claims. (Cl. 117—161)

The present invention relates to a rigid, nonplastic substrate having directly adhered and firmly bonded thereto a durable, weather-resistant, hard, thermoplastic layer of substantial thickness. More particularly, it relates to substrates, such as masonry blocks of cement, concrete, cinder, slag, clay, and unglazed tile, as well as sheet asbestos, wood, fiberboard, plasterboard, metal, such as aluminum, steel and iron, or the like, preferably having a compressive strength of at least 200 pounds per square inch, with a relatively thick layer of hard, acrylic thermoplastic directly and permanently affixed thereto. It also relates to methods of preparing such structures.

When coatings are applied to rigid substrates, such as those referred to above, by methods heretofore known, the material which ultimately becomes the coating is carried in a solvent or dispersant which must be disposed of before the coating becomes affixed to the substrate. Furthermore, to establish a coating of any reasonable degree of thickness it is customary to apply several separate layers of the same or different materials in a fluid state, between each of which one must wait until that previously applied becomes thoroughly dry.

It is also known that polymeric sheet or film may be adhered to various rigid substrates, such as metal, glass, plastics, and the like, with an adhesive or bonding agent. Such structures not only require the application of special types of adhesives but also involve time-consuming operations such as are required to properly apply the adhesive and to permit it to set.

An object of this invention is to produce unique and improved structures of the type mentioned in the first paragraph above by relatively simple techniques which consume a minimum of time. Other objects and advantages will appear from the detailed description and illustrate examples given below.

In accordance herewith, there is first prepared an admixture of doughlike consistency comprising a monomeric component and a polymeric component. The monomeric component is preferably methyl methacrylate or a monomeric mixture preponderantly of methyl methacrylate with a minor proportion of another monomer copolymerizable therewith, such as ethyl acrylate, methyl acrylate, butanediol dimethacrylate, acrylic or methacrylic acid, styrene, and similar monomers or mixtures thereof having polymerizable ethylenic unsaturation which copolymerize with methyl methacrylate.

The polymeric component is preferably polymeric methyl methacrylate or a copolymer of methyl methacrylate in preponderance with a minor proportion of another monomer or mixture of other monomers copolymerizable therewith, such as those referred to above in connection with the monomeric component. It is preferred that methyl methacrylate be contained in the copolymer at least to the extent of 85% by weight.

A free radical initiator of a type well known in the art is introduced thereinto to aid in the polymerization of the polymerizable monomeric component when the dough is subsequently subjected to heat and pressure, as will be referred to below. Such initiators are preferably added to the monomer in amounts of the order of 0.1 to 2%, based upon the weight of monomer used, prior to admixing monomer with polymer.

The doughlike materials contain within the range of about 50 to about 90 parts by weight of polymeric component and correspondingly about 50 to about 10 parts by weight of monomeric component per 100 parts of weight of such components. It is preferred that the polymer be used within the range of about 60 to about 70 with correspondingly about 40 to about 30 parts of monomer.

Mixing of the components is carried out in any suitable mixing device, such as a sigma blade mixer, until a dough is obtained. The mixing operation usually requires something of the order of ten to thirty minutes when a mixer of the type specifically referred to above is used. Coloring materials and other additives, such as fire-retarders, ultraviolet light absorbers, and the like, as may be desired may be incorporated into the dough, preferably during the mixing operation.

The doughy material is then brought into contact with the surface of the substrate to be covered. A compressible retaining ring, comparable in internal dimensions with the area of the surface to be covered, is placed over said area. The ring is of a thickness such that when compressed it corresponds to the thickness of the layer to be applied to the substrate. A cellophane sheet, placed between the compressing platen, retaining ring and the dough, facilitates release from the platen and ring of the surface of the thermoplastic material after the thermoplastic material has been polymerized and becomes bonded to the substrate. The dough is then compressed using, for example, a heated platen of a compression molding machine causing the dough to spread to the limits permitted by the retaining ring. Pressure from 150 pounds per square inch upwards and moderate heat from 75° to 150° C. are applied for a relatively short length of time, for example, about two to ten minutes, to cause the dough to cure and firmly adhere to the substrate. Pressure of the order of 200 to 500 pounds per square inch and temperatures of the order of 90° to 110° C. are preferred. The lower limit of thickness of the thermoplastic layer adhered to the substrate is about two mils. Layers of ten mils and upwards are readily attainable.

The viscosity average molecular weight of the thermoplastic layer applied to a nonplastic substrate in accordance herewith may range from a lower limit of about 90,000 upwards, and preferably from about 200,000 upwards to about 2,000,000. The Rockwell hardness will depend upon the thickness of the layer and may be of the order of M–50 and higher, for instance up to about M–100.

Example 1

A neoprene ring $\frac{1}{10}''$ thick, $\frac{1}{2}''$ wide and with outer dimensions of 8" x 10" was placed on the heated (100° C.) lower platen of a flat bed press. A sheet of cellophane film somewhat larger than the outer dimensions of the retaining ring was placed over it. A portion of acrylic dough consisting of 64.4 parts by weight of poly(methyl methacrylate) of 120,000 viscosity average molecular weight, 35 parts by weight of methyl methacrylate monomer (containing 0.5% benzoyl peroxide and 0.5% acetyl peroxide), 0.5 part by weight of titanium dioxide, and 0.1 part by weight of green pigment, which had been preweighed to provide a volume somewhat greater than that enclosed by the neoprene ring after polymerization, was placed on the cellophane within the confines of the ring. An 8" x 10" x 2" concrete block was then placed directly upon the dough and in line with the extremities of the retaining ring. The top platen of the press was lowered on the block to compress the dough against the face of the block and to the extremities of the ring, a pressure of 500 pounds per square inch being applied for five minutes. The press was opened, the concrete block removed, and the cellophane film parted from the surface of the acrylic coating, which was 1/10″ thick and firmly bonded to the surface of the block. Alternate heating (100° C.) and freezing this block for five cycles even when soaked in water failed to release the acrylic coating. After six months' exposure outdoors no changes in the coating itself or its bond to the block were noted.

*Example 2*

An acrylic coating was applied to a 5″ x 5″ fiberboard as follows: A retaining ring cut to the size of the board from 0.010″ thick manila paper was placed on the lower platen of a heated (100° C.) flat bed press. A sheet of cellophane film was then placed over the retaining ring. A weighed portion of a catalyzed acrylic dough mix of the type used in Example 1, but without pigment, was placed on the cellophane. The fiberboard was then placed directly over the dough and retaining ring and the top platen of the press lowered to compress the dough against the board surface. A pressure of 500 pounds per square inch was maintained for five minutes. The board was then removed from the press and had a clear, acrylic film ten mils in thickness firmly bonded to its surface. Attempts to remove the film caused tearing of the surface of the board itself.

*Example 3*

An acrylic coating was applied to a 6″ x 6″ x 1/8″ aluminum plate as follows: A retaining ring 1/2″ wide cut to the size of the aluminum plate from 0.010″ thick manila paper was placed on the lower platen of a heated (100° C.) flat bed press. A sheet of cellophane was placed over the retaining ring. A weighed portion of acrylic dough consisting of 67.5 parts by weight of poly(methyl methacrylate) of 120,000 viscosity average molecular weight, 29.25 parts by weight of methyl methacrylate monomer, and 3.25 parts by weight of methacrylic acid monomer (the monomers containing 0.5% benzoyl peroxide and 0.5% acetyl peroxide) was placed on the cellophane within the confines of the retaining ring. The aluminum plate was placed directly on the dough and the retaining ring and the top platen of the press lowered to compress the dough against the surface of the aluminum plate. A pressure of 500 pounds per square inch was maintained for five minutes. The aluminum plate was then removed from the press. It had a clear, acrylic film 0.010″ thick firmly bonded to its surface. Temperature cycling (−50° C. to 70° C.) failed to cause release of the acrylic film from the aluminum plate or to mar the crystal clarity and pleasing surface of the film.

*Example 4*

An acrylic coating was applied to a 6″ x 6″ x 1/8″ aluminum plate as follows: A thin film of methacrylic acid monomer (containing 0.5% by weight of acetyl peroxide) was applied to the surface of the aluminum plate with a paint brush. A retaining ring 1/2″ wide cut to the size of the aluminum plate from 0.035″ thick cardboard was placed on the lower platen of a heated (100° C.) flat bed press. A sheet of cellophane was placed over the retaining ring. A weighed portion of acrylic dough consisting of 65 parts by weight of a finely divided copolymer, prepared by suspension polymerizing a mixture of 100 parts of methyl methacrylate and 15 parts of ethyl acrylate, and 35 parts by weight of monomeric methyl methacrylate containing 0.5% benzoyl peroxide and 0.5% acetyl peroxide, was placed on the cellophane within the confines of the retaining ring. The aluminum plate was placed directly on the dough and the top platen of the press was lowered to compress the dough against the methacrylic acid wetted surface of the aluminum plate. A pressure of 500 pounds per square inch was maintained for five minutes. The aluminum plate was then removed from the press. It had a clear, acrylic film 0.030″ thick firmly bonded to its surface. Temperature cycling (−50° C. to 70° C.) failed to cause release of the acrylic coating from the aluminum plate or to deteriorate the surface gloss and clarity of the acrylic film.

*Example 5*

A modified acrylic coating was applied to the surface of a concrete block as follows: A neoprene ring 1/10″ thick, 1/2″ wide and with outer dimensions of 8″ x 8″ was placed on the heated (100° C.) platen of a flat bed press. A sheet of cellophane was placed over the retaining ring. A weighed portion of acrylic dough consisting of 37.1 parts by weight of a finely divided acrylic copolymer of the type described in Example 4, 22.3 parts by weight of monomeric methyl methacrylate containing 0.5% benzoyl peroxide and 0.5% acetyl peroxide, 40.0 parts by weight of talc filler, 0.5 part by weight of titanium dioxide, and 0.1 part by weight of a green pigment was placed on the cellophane sheet within the confines of the retaining ring. An 8″ x 8″ x 2″ concrete block was then placed directly on the dough and retaining ring and the top platen of the press was lowered to compress the dough against the face of the block. A pressure of 300 pounds per square inch was applied for ten minutes. The concrete block was then removed from the press. It had a smooth coating 1/10″ thick firmly bonded to its surface. After six months' exposure outdoors no changes in the coating itself or its bond to the concrete block were noted.

*Example 6*

A modified acrylic coating was applied to the surface of a concrete block in the same manner as described in Example 5. The acrylic dough utilized in this instance consists of 45.5 parts by weight of an acrylic copolymer of the type described in Example 4, 24.5 parts by weight of monomeric methyl methacrylate containing 0.5% benzoyl peroxide and 0.5% acetyl peroxide, 20.0 parts by weight of Chlorowax 70, a chlorinated hydrocarbon manufactured by Diamondl Alkali and recommended as a flame retarder, and 10.0 parts by weight of antimony trioxide. The resultant acrylic coating on the concrete block was found to be self-extinguishing.

This invention provides a wide variety of articles of manufacture or structures. The exposed plastic surface of such structures may be smooth with a high gloss, patterned, contoured or otherwise formed into a variety of shapes, depending upon the configuration of the platen which is brought into contact with the dough during the compression operation. Thus letters, numbers, or an almost infinite variety of designs, either in clear or in colored plastic directly attached to a substrate are provided.

It is to be understood that the doughlike mixtures referred to above may be made up in substantial bulk to be subseqently used over an extended period. Thus such mixtures may be stored or transported to a destination other than that where it is prepared for ultimate use.

What we claim is:

1. A method of applying and firmly bonding a layer of thermoplastic material of substantial thickness directly to a rigid, nonplastic substrate which comprises forming a mixture of doughlike consistency consisting essentially of a monomeric component, a polymeric component and a polymerization initiator, spreading said mixture in a substantially uniform layer over a surface of the substrate, and thereafter subjecting the assembly to heat at a temperature of 75° to 150° C. and pressure of the order of 150 to 500 pounds per square inch mechanically applied to the exposed surface of the dough for a period of about 2 to about 10 minutes, said monomeric component being a member of the group consisting of methyl methacrylate and mixtures of methyl methacrylate in preponderance with a minor amount of another monomer copolymerizable therewith and said polymeric component being a member of the group consisting of poly-(methyl methacrylate) and copolymers of methyl methacrylate in preponderance with a minor amount of another monomer copolymerizable therewith.

2. A method as in claim 1 wherein the dough comprises 50 to 90 parts by weight of the polymeric component and 50 to 10 parts by weight of the monomeric component.

3. A method as in claim 1 wherein the polymeric component is poly-(methyl methacrylate) and the monomer is methyl methacrylate.

4. A method as in claim 1 wherein the polymeric component is a copolymer of methyl methacrylate in preponderance and a minor amount of ethyl acrylate.

References Cited by the Examiner
UNITED STATES PATENTS

| | | | |
|---|---|---|---|
| 2,413,973 | 1/47 | Howk et al. | 260—86.1 |
| 2,684,305 | 7/54 | Quinlivan | 117—33 |
| 2,947,716 | 8/60 | Cornell et al. | 260—45.5 |
| 3,060,148 | 10/62 | Evans et al. | 260—45.5 |
| 3,084,068 | 4/63 | Munn | 117—161 |

RICHARD D. NEVIUS, *Primary Examiner.*